(12) United States Patent
Ding et al.

(10) Patent No.: US 11,069,904 B1
(45) Date of Patent: Jul. 20, 2021

(54) METHOD FOR PREPARING FLEXIBLE MEMBRANE-FREE AND WIRE-SHAPED FUEL CELL

(71) Applicant: JIANGSU UNIVERSITY, Zhenjiang (CN)

(72) Inventors: Jianning Ding, Zhenjiang (CN); Xiaoshuang Zhou, Zhenjiang (CN); Ningyi Yuan, Zhenjiang (CN); Xinghao Hu, Zhenjiang (CN)

(73) Assignee: JIANGSU UNIVERSITY, Zhenjiang (CN)

(*) Notice: Subject to any disclaimer, the term of this patent is extended or adjusted under 35 U.S.C. 154(b) by 0 days.

(21) Appl. No.: 17/055,610

(22) PCT Filed: Jun. 18, 2019

(86) PCT No.: PCT/CN2019/091642
§ 371 (c)(1),
(2) Date: Nov. 16, 2020

(87) PCT Pub. No.: WO2020/181673
PCT Pub. Date: Sep. 17, 2020

(30) Foreign Application Priority Data

Mar. 11, 2019 (CN) .......................... 201910206815.8

(51) Int. Cl.
*H01M 8/00* (2016.01)
*H01M 4/86* (2006.01)
*H01M 4/90* (2006.01)
*H01M 4/88* (2006.01)
*H01M 4/02* (2006.01)

(52) U.S. Cl.
CPC ......... *H01M 8/002* (2013.01); *H01M 4/8657* (2013.01); *H01M 4/8878* (2013.01);
(Continued)

(58) Field of Classification Search
None
See application file for complete search history.

(56) References Cited

U.S. PATENT DOCUMENTS

| 2008/0044707 A1 | 2/2008 | Chou et al. |
| 2010/0151342 A1* | 6/2010 | Campbell ......... H01M 8/04126 429/442 |

(Continued)

FOREIGN PATENT DOCUMENTS

| JP | 2011108525 A | 6/2011 |
| WO | 2017123289 A2 | 7/2017 |

OTHER PUBLICATIONS

Ahn, S. H., Yu, X., & Manthiram, A. (2017). "Wiring" Fe-Nx-Embedded Porous Carbon Framework onto 1D Nanotubes for Efficient Oxygen Reduction Reaction in Alkaline and Acidic Media. Advanced Materials, 29(26), 1606534. 2016 (Year: 2016).*

(Continued)

*Primary Examiner* — Ula C Ruddock
*Assistant Examiner* — Amanda Rosenbaum
(74) *Attorney, Agent, or Firm* — Bayramoglu Law Offices LLC

(57) ABSTRACT

A method for preparing a flexible membrane-free and wire-shaped fuel cell is provided. A carbon nanotube sheet is twisted and loaded with a catalyst to obtain a (CNT)@Fe$_3$[Co(CN)$_6$]$_2$ cathode electrode; the carbon nanotube sheet is twisted and coated with a nickel powder to obtain a CNT@nickel particle anode electrode; and the (CNT)@Fe[Co(CN)$_6$]$_2$ cathode electrode, the CNT@nickel particle anode electrode, and a fuel electrolyte of $H_2O_2$ are integrated in a silicone tube to obtain a flexible membrane-free and wire-shaped fuel cell. The flexible membrane-free and wire-shaped fuel cell of the present invention can generate an open-circuit voltage of 0.88 V, while having very good flexibility, and can be woven into textiles such as clothes, thereby having great application prospects in the field of portable energy supply.

7 Claims, 5 Drawing Sheets

(52) U.S. Cl.
CPC ....... *H01M 4/9033* (2013.01); *H01M 4/9083* (2013.01); *H01M 2004/021* (2013.01)

(56) References Cited

U.S. PATENT DOCUMENTS

2010/0151354 A1* 6/2010 Wilkinson ........ H01M 8/04197
429/500
2015/0214554 A1* 7/2015 Kaneda ............... H01M 4/9016
429/484
2017/0098843 A1* 4/2017 Manthiram ........... H01M 4/921

OTHER PUBLICATIONS

Deng, J., Yu, L., Deng, D., Chen, X., Yang, F., & Bao, X. (2013). Highly Active Reduction of Oxygen on a Feco Alloy Catalyst Encapsulated in Pod-Like Carbon Nanotubes with Fewer Walls. Journal of Materials Chemistry A, 1(47), 14868-14873. 2013 (Year: 2013).*

Lee, Y.K., Jang, S.H., Kim, M.S. et al. Effect of multi-walled carbon nanotube on the electrical, morphological and mechanical properties of polypropylene/nickel-coated carbon fiber composites. Macromol. Res. 18, 241-246 (2010). (Year: 2010).*

Sung Hoon Ahn, et al., "Wiring" Fe-Nx-Embedded Porous Carbon Framework onto 1D Nanotubes for Efficient Oxygen Reduction Reaction in Alkaline and Acidic Media, Advanced Materials, 2017, pp. 1-10, 1606534.

Xiaoshuang Zhou, et al., Wire-Shaped and Membrane-Free Fuel Cell Based on Biscrolled Carbon Nanotube Yarn, Energy Technology, 2019, pp. 1-6, 1900122.

* cited by examiner

METHOD FOR PREPARING FLEXIBLE MEMBRANE-FREE AND WIRE-SHAPED FUEL CELL

CROSS REFERENCE TO THE RELATED APPLICATIONS

This application is the national phase entry of International Application No. PCT/CN2019/091642, filed on Jun. 18, 2019, which is based upon and claims priority to Chinese Patent Application No. 201910206815.8, filed on Mar. 11, 2019, the entire contents of which are incorporated herein by reference.

TECHNICAL FIELD

The present invention relates to the technical field of wire-shaped fuel cells, and specifically to a method for preparing a flexible membrane-free and wire-shaped fuel cell.

BACKGROUND

Wearable electronics have received much attention because of their broad applications such as health monitoring, smart skin, and sensors. To power these wearable electronic devices, flexible power supplies are indispensable. Wire-shaped energy storage systems are desirable for the wearable electronics, because fibers and/or yarns are lightweight, flexible, and weavable. Therefore, tremendous efforts have been made in the research of wire-shaped energy storage devices, including wire-shaped lithium ion batteries, supercapacitors, solar cells, and so on. However, due to difficulties of wearable wire-shaped fuel cells in assembly, membranes, electrolytes, catalysts, and other aspects, few research has been done at present.

The fuel cell is a type of power sources having high conversion efficiency and high energy density, which converts chemical energy into electrical energy by reduction and oxidation reactions on surfaces of a cathode and an anode. Thus, it is necessary to implement flexible wire-shaped fuel cells in the fields of flexible wearable electronics and textiles. However, a flow field and a current collector of a conventional fuel cell are usually rigid, heavy, and inflexible, such as a metal plate or graphite plate, and cannot be integrated or woven into flexible electronics or textiles. Meanwhile, a membrane structure of the conventional fuel cell also lacks reliability and difficulty for the design of wire-shaped devices. Therefore, it is desired to design and manufacture a flexible wire-shaped fuel cell from the following two aspects: one is preparing a flexible wire-shaped collector electrode loaded with catalytic nanoparticles; and the other is exploring the reaction mechanism of a fuel cell based on a membrane-free single compartment.

SUMMARY

The technical problems to be solved in the present invention are technical problems such as wire-shaping, miniaturization, and portability of fuel cells, so as to provide a method for preparing a flexible membrane-free and wire-shaped fuel cell.

The technical solution employed in the present invention to solve the technical problems thereof is to load a catalyst on a carbon nanotube yarn, and utilize the properties of hydrogen peroxide as both a reductant fuel and an oxidant to enable a cathode and an anode to be placed in the same compartment without a membrane, and meanwhile, coat the anode with a spaced-apart yarn to avoid a short-circuit therebetween.

The method for preparing the flexible membrane-free and wire-shaped fuel cell includes the following steps:

(1) weighing $FeSO_4.7H_2O$ and $K_3[Co(CN)_6]$ reagents and formulating the reagents into aqueous solutions respectively, mixing the aqueous solutions to obtain a suspension under magnetic stirring, filtering the suspension to leave a precipitate, washing the precipitate using deionized water, and performing low-temperature drying under vacuum on the precipitate to obtain a catalyst $Fe_3[Co(CN)_6]_2$;

(2) drawing a carbon nanotube sheet out from a carbon nanotube forest, and stacking a number of layers of the carbon nanotube sheet which then are rolled into a cylindrical shape, formulating the catalyst $Fe_3[Co(CN)_6]_2$ in step (1) and an ethanol solution into a catalyst solution with a certain concentration, and then uniformly drip-coating the catalyst solution onto the carbon nanotube sheet with the cylindrical shape, before twisting into a uniform (CNT)@$Fe_3[Co(CN)_6]_2$ cathode electrode yarn by means of a motor;

(3) spreading a number of layers of the carbon nanotube sheet on a glass sheet, and then ultrasonically dispersing a nickel nanopowder in a dimethylformamide (DMF) solution to prepare a dispersion, and then uniformly drip-coating the dispersion onto the carbon nanotube sheet, before twisting into a CNT@nickel particle anode electrode yarn by means of a motor;

(4) after the CNT@nickel particle anode electrode yarn is naturally dried, by means of two synchronous motors, coating a layer of polypropylene (PP) monofilament on a surface of the CNT@nickel particle anode electrode yarn to obtain a CNT@nickel@PP electrode;

(5) weighing a hydrogen peroxide solution, a perchloric acid solution, and a sodium chloride salt to formulate a fuel electrolyte; and (6) twisting the (CNT)@$Fe_3[Co(CN)_6]_2$ cathode electrode yarn and the CNT@nickel@ PP electrode together, placing them into a silicone tube, and injecting the electrolyte thereto, so as to obtain a flexible wire-shaped hydrogen peroxide fuel cell.

As a preferred embodiment of the present invention, in step (1), the aqueous solutions of $FeSO_4.7H_2O$ and $K_3[Co(CN)_6]$ have concentrations of 0.2 mol/l and 0.15 mol/l, respectively. The mixing is performed at a volume ratio of 1:1, and the magnetic stirring is performed at a rotational speed of 240 revolutions per minute. The low-temperature drying under vacuum is performed for a time of 6 to 10 hours at a temperature of 40° C.

As a preferred embodiment of the present invention, in step (2), the carbon nanotube sheet has a length of 15 cm and a width of 2.5 cm, and the number of the layers is 10 layers. The concentration of the catalyst is 5 mg/ml, and an amount of the catalyst solution added dropwise is 1 ml. The twisting by means of the motor is performed at a rotational speed of 100 revolutions per minute for a time of 1 min.

As a preferred embodiment of the present invention, in step (3), the carbon nanotube sheet has a length of 15 cm and a width of 2.5 cm, and the number of the layers is 10 layers. In the dispersion, a concentration of the nickel nanopowder is 20 mg/ml, and an amount of the dispersion added dropwise is 2 ml. The twisting by means of the motor is performed at a rotational speed of 100 revolutions per minute for a time of 1 min.

As a preferred embodiment of the present invention, in step (4), the two synchronous motors have a rotational speed of 50 revolutions per minute, and the PP monofilament has a diameter of 100 micrometers.

As a preferred embodiment of the present invention, in step (5), a concentration of the hydrogen peroxide is 0.03 mol/l, a concentration of the perchloric acid solution is 0.15 mol/l, a concentration of the sodium chloride solution is 0.1 mol/l, and the three solutions are mixed at a volume ratio of 1:1:1.

As a preferred embodiment of the present invention, the silicone tube in step (6) has an inner diameter of 0.1 mm and a length of 10 to 20 cm.

The beneficial effects of the present invention are that the method is simple, has a high efficiency and a good stability, and facilitates large-scale industrial production.

The specific manifestations are as follows:

1. Using the twisted yarn in which the carbon nanotube sheet tightly coats the catalyst particles will maintain very good flexibility and stability even during the bending process.

2. The use of the insulating spaced-apart polypropylene yarn ensures that the phenomenon of short-circuit due to the contact between the cathode and the anode does not occur during bending in the wire-shaped fuel cell.

3. The wire-shaped fuel cell has weavability, which makes it possible to apply a portable fuel cell to textiles.

4. The encapsulation of the silicone tube ensures the acid and alkali resistance and safety of the cell.

DETAILED DESCRIPTION OF THE EMBODIMENTS

Figure 1:
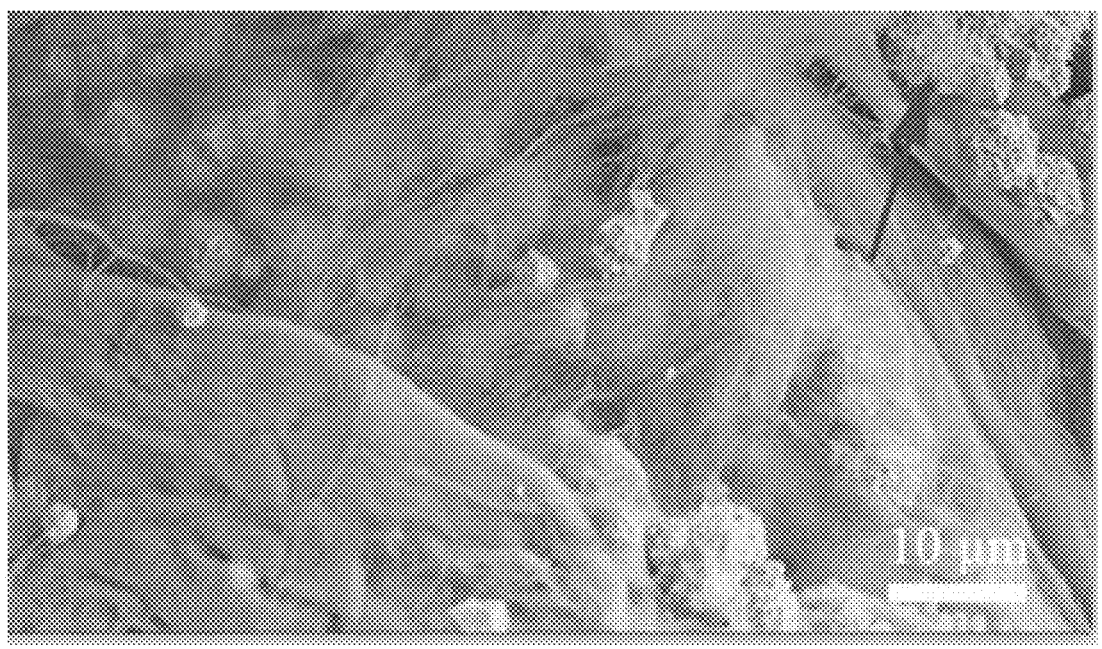
FIG. 1 is a scanning electron microscopy (SEM) image of an anode electrode prepared in the present invention.

In order to make the aforementioned objectives, features, and advantages of the present invention comprehensible, the present invention will be described in further detail below in conjunction with the drawings and specific embodiments.

As used herein, references to "one embodiment" or "embodiments" are to be understood as describing particular features, structures, or characteristics included in at least one implementation of the present invention. Expressions "in one embodiment" appearing at different places of this description do not all refer to the same embodiment, or embodiments exclusive from other embodiments alone or alternatively. In addition, it should be noted that the mass fraction purity of $FeSO_4 \cdot 7H_2O$, $K_3[Co(CN)_6]$, and NaCl is 99.99% wt, and the concentration of perchloric acid and ethanol (Analytical Reagent, AR)/hydrogen peroxide is 30% wt. DMF represents dimethylformamide (Analytical Reagent, AR).

Example 1

(1) $FeSO_4 \cdot 7H_2O$ and $K_3[Co(CN)_6]$ reagents are weighed and formulated into 20 ml of a 0.2 mol/L aqueous solution and 20 ml of a 0.15 mol/L aqueous solution, respectively. The $FeSO_4 \cdot 7H_2O$ aqueous solution is slowly added to the $K_3[Co(CN)_6]$ aqueous solution to obtain a suspension under magnetic stirring at 240 revolutions per minute. The suspension is filtered to leave a precipitate, and the precipitate is centrifugally washed 3 to 5 times using deionized water, and then is dried for 8 h in a vacuum oven at 40° C. to obtain a catalyst $Fe_3[Co(CN)_6]_2$.

(2) A carbon nanotube sheet is drawn out from a carbon nanotube forest, the carbon nanotube sheet has a length of 15 cm and a width of 2.5 cm, and 10 layers of the carbon nanotube sheet are stacked, and then rolled into a cylindrical shape. The catalyst in step (1) and an ethanol solution are formulated into a certain amount of a 5 mg/mL solution, and then 1 ml of the catalyst solution is measured and uniformly drip-coated onto the cylindrical carbon sheet which then is twisted for 1 min by means of a motor at 100 revolutions per minute to obtain a uniform $(CNT)@Fe_3[Co(CN)_6]_2$ cathode electrode yarn.

(3) The carbon nanotube sheet is spread on a glass sheet, the carbon nanotube sheet has a length of 15 cm and a width of 2.5 cm, and 10 layers of the carbon nanotube sheet are stacked. Then, a nickel nanopowder is ultrasonically dispersed in a DMF solution to prepare a 20 mg/ml dispersion, then 2 ml of the dispersion is weighed and uniformly drip-coated onto the nano carbon sheet which then is twisted for 1 min by means of a motor at 100 revolutions per minute to obtain a CNT@nickel particle anode electrode yarn.

(4) After the CNT@nickel particle yarn is naturally dried, by means of two synchronous motors at a rotational speed of 50 revolutions per minute, a polypropylene (PP) monofilament having a diameter of 100 micrometers is coated on a surface of the CNT@nickel particle yarn to obtain a CNT@nickel@PP electrode.

(5) 0.3 mol/hydrogen peroxide, 0.15 mol/l perchloric acid, and 0.1 mol/l sodium chloride are weighed and formulated into a mixed aqueous solution, where the three solutions are mixed at a volume ratio of 1:1:1, obtaining a fuel electrolyte.

(6) The $(CNT)@Fe_3[Co(CN)_6]_2$ and the CNT@nickel@PP electrode are twisted together and placed into a silicone tube, and the electrolyte is injected thereto, so as to obtain a flexible wire-shaped hydrogen peroxide fuel cell.

Example 2

(1) $FeSO_4 \cdot 7H_2O$ and $K_3[Co(CN)_6]$ reagents are weighed and formulated into 20 ml of a 0.20 mol/L aqueous solution and 20 ml of a 0.15 mol/L aqueous solution, respectively. The $FeSO_4 \cdot 7H_2O$ aqueous solution is slowly added to the $Ki[Co(CN)_6]$ aqueous solution to obtain a suspension under magnetic stirring at 240 revolutions per minute. The suspension is filtered to leave a precipitate, and the precipitate is centrifugally washed 3 to 5 times using deionized water, and then is dried for 8 h in a vacuum oven at 25° C. to obtain a catalyst $Fe_3[Co(CN)_6]_2$.

(2) A carbon nanotube sheet is drawn out from a carbon nanotube forest, the carbon nanotube sheet has a length of 15 cm and a width of 3 cm, and 15 layers of the carbon nanotube sheet are stacked, and then rolled into a cylindrical shape. The catalyst in step (1) and an ethanol solution are formulated into a certain amount of a 5 mg/mL solution, and then 1 ml of the catalyst solution is measured and uniformly drip-coated onto the cylindrical carbon sheet which then is twisted for 2 min by means of a motor at 100 revolutions per minute to obtain a uniform $(CNT)@Fe_3[Co(CN)_6]_2$ cathode electrode yarn.

(3) The carbon nanotube sheet is spread on a glass sheet, the carbon nanotube sheet has a length of 15 cm and a width of 3 cm, and 10 layers of the carbon nanotube sheet are stacked. Then, a nickel nanopowder is ultrasonically dispersed in a DMF solution to prepare a 20 mg/ml dispersion, then 2 ml of the dispersion is weighed and uniformly drip-coated onto the nano carbon sheet which then is twisted for 1 min by means of a motor at 100 revolutions per minute to obtain a CNT@nickel particle anode electrode yarn.

(4) After the CNT@nickel particle yarn is naturally dried, by means of two synchronous motors at a rotational speed of 25 revolutions per minute, a polypropylene (PP) monofilament having a diameter of 100 micrometers is coated on a surface of the CNT@nickel particle yarn to obtain a CNT@nickel@PP electrode.

(5) 0.3 mol/l hydrogen peroxide, 0.15 mol/l perchloric acid, and 0.1 mol/sodium chloride are weighed and formulated into a mixed aqueous solution, where the three solutions are mixed at a volume ratio of 1:1:1, obtaining a fuel electrolyte.

(6) The $(CNT)@Fe_3[Co(CN)_6]_2$ and the CNT@nickel@PP electrode are twisted together and placed into a silicone tube, and the electrolyte is injected thereto, so as to obtain a flexible wire-shaped hydrogen peroxide fuel cell.

Example 3

(1) $FeSO_4.7H_2O$ and $K_3[Co(CN)_6]$ reagents are weighed and formulated into 20 ml of a 0.20 mol/L aqueous solution and 20 ml of a 0.15 mol/L aqueous solution, respectively. The $FeSO_4.7H_2O$ aqueous solution is slowly added to the $K_3[Co(CN)_6]$ aqueous solution to obtain a suspension under magnetic stirring at 240 revolutions per minute. The suspension is filtered to leave a precipitate, and the precipitate is centrifugally washed 3 to 5 times using deionized water, and then is dried for 8 h at room temperature to obtain a catalyst $Fe_3[Co(CN)_6]_2$.

(2) A carbon nanotube sheet is drawn out from a carbon nanotube forest, the carbon nanotube sheet has a length of 15 cm and a width of 4 cm, and 15 layers of the carbon nanotube sheet are stacked, and then rolled into a cylindrical shape. The catalyst in step (1) and an ethanol solution are formulated into a certain amount of a 5 mg/mL solution, and then 1 ml of the catalyst solution is measured and uniformly drip-coated onto the cylindrical carbon sheet which then is twisted for 1.5 min by means of a motor at 100 revolutions per minute to obtain a uniform $(CNT)@Fe_3[Co(CN)_6]_2$ cathode electrode yarn.

(3) The carbon nanotube sheet is spread on a glass sheet, the carbon nanotube sheet has a length of 15 cm and a width of 4 cm, and 10 layers of the carbon nanotube sheet are stacked. Then, a nickel nanopowder is ultrasonically dispersed in a DMF solution to prepare a 20 mg/ml dispersion, then 2 ml of the dispersion is weighed and uniformly drip-coated onto the nano carbon sheet which then is twisted for 1 min by means of a motor at 100 revolutions per minute to obtain a CNT@nickel particle anode electrode yarn.

(4) After the CNT@nickel particle yarn is naturally dried, by means of two synchronous motors at a rotational speed of 50 revolutions per minute, a polypropylene (PP) monofilament having a diameter of 100 micrometers is coated on a surface of the CNT@nickel particle yarn to obtain a CNT@nickel@PP electrode.

(5) 0.3 mol/l hydrogen peroxide, 0.15 mol/l perchloric acid, and 0.1 mol/sodium chloride are weighed and formulated into a mixed aqueous solution, where the three solutions are mixed at a volume ratio of 1:1:1, obtaining a fuel electrolyte.

(6) The $(CNT)@Fe_3[Co(CN)_6]_2$ and the CNT@nickel@PP electrode are twisted together and placed into a silicone tube, and the electrolyte is injected thereto, so as to obtain a flexible wire-shaped hydrogen peroxide fuel cell.

The difference between the three examples lies in that different widths and different numbers of layers ensure different distributions of the loading and different mass ratios of the loading, where Example 1 is the most preferred example.

Figure 2:
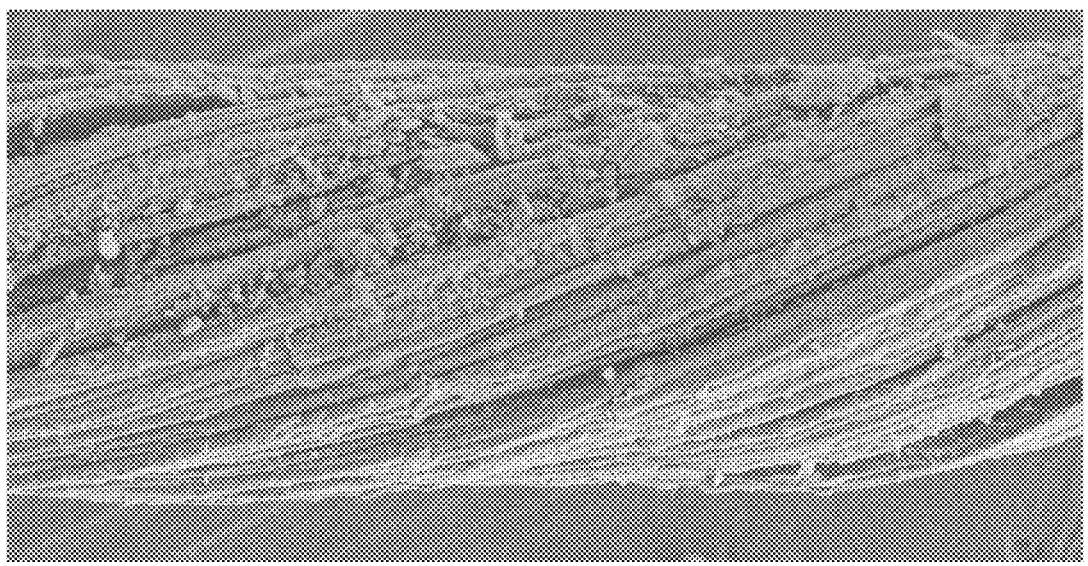
FIG. 2 is an SEM image of a cathode electrode prepared in the present invention.
Figure 3:
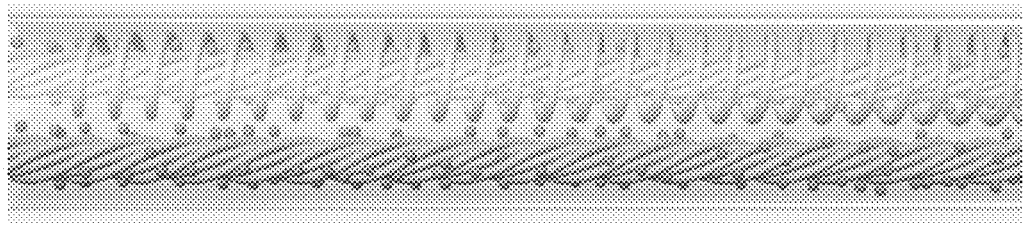
FIG. 3 is a schematic diagram of a wire-shaped fuel cell prepared in the present invention.
Figure 4:
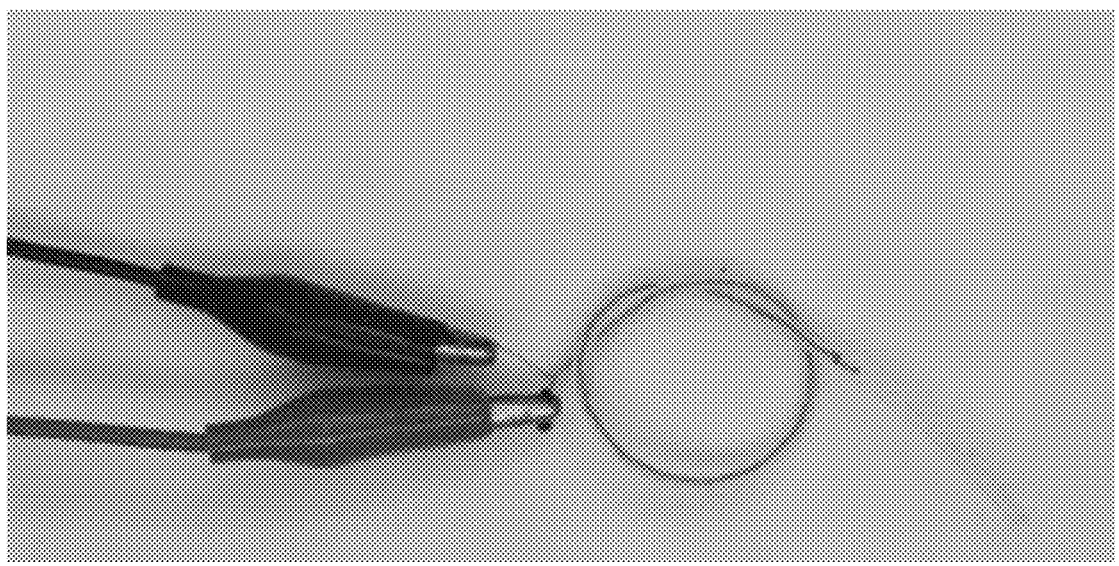
FIG. 4 is a photograph of devices of the wire-shaped fuel cell prepared in the present invention.
Figure 5:
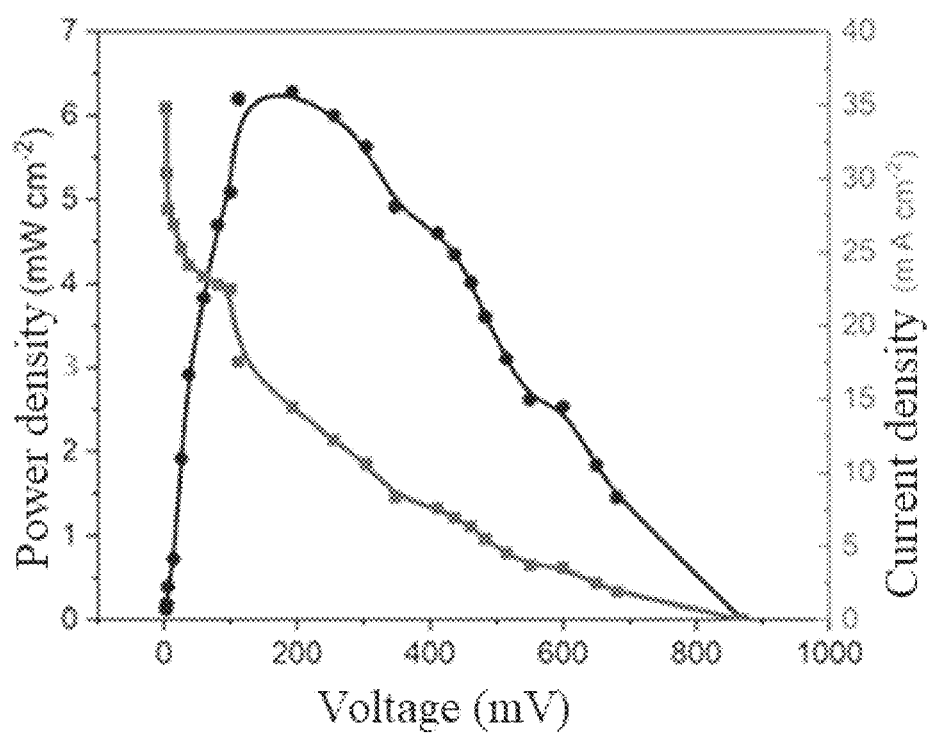
FIG. 5 is a graph showing performances of the wire-shaped fuel cell prepared in the present invention.

From FIGS. 1 and 2, it can be seen that the loaded catalyst is uniformly coated on the carbon nanotube yarn. FIG. 3 is a schematic diagram of the prepared fuel cell, from which structural parts of the device can be seen. FIG. 4 is a photograph of devices of the actually manufactured wire-shaped fuel cell. FIG. 5 is a graph showing performances of the finally obtained device. From FIG. 5, it can be seen that the wire-shaped fuel cell can provide a stable voltage of 0.89 V and a power density as high as 6.2 mW cm.

What is claimed is:

1. A method for preparing a flexible membrane-free and wire-shaped fuel cell, comprising the following steps:
   (1) weighing reagents of $FeSO_4.7H_2O$ and $K_3[Co(CN)_6]$ and formulating the reagents into aqueous solutions of $FeSO_4.7H_2O$ and $K_3[Co(CN)_6]$ respectively, mixing the aqueous solutions to obtain a suspension under a magnetic stirring, filtering the suspension to obtain a precipitate, washing the precipitate using deionized water, and performing a low-temperature drying under vacuum on the precipitate to obtain a catalyst $Fe_3[Co(CN)_6]_2$;
   (2) drawing a carbon nanotube sheet out from a carbon nanotube forest, and stacking a first number of layers of the carbon nanotube sheet, rolling the first number of layers of the carbon nanotube sheet into a cylindrical shape, formulating the catalyst $Fe_3[Co(CN)_6]_2$ in step (1) and an ethanol solution into a catalyst solution with a predetermined concentration, and then uniformly drip-coating the catalyst solution onto the first number of layers of the carbon nanotube sheet with the cylindrical shape, before twisting the first number of layers of the carbon nanotube sheet with the cylindrical shape into a uniform $(CNT)@Fe_3[Co(CN)_6]_2$ cathode electrode yarn by means of a motor;
   (3) spreading a second number of layers of the carbon nanotube sheet on a glass sheet, and then ultrasonically dispersing a nickel nanopowder in a dimethylformamide (DMF) solution to prepare a dispersion, and then uniformly drip-coating the dispersion onto the second number of layers of the carbon nanotube sheet, before twisting the second number of layers of the carbon nanotube sheet into a CNT@nickel particle anode electrode yarn by means of the motor;
   (4) after the CNT@nickel particle anode electrode yarn is naturally dried, by means of two synchronous motors, coating a layer of polypropylene (PP) monofilament on a surface of the CNT@nickel particle anode electrode yarn to obtain a CNT@nickel@PP electrode;
   (5) weighing a hydrogen peroxide solution, a perchloric acid solution, and a sodium chloride salt solution to formulate a fuel electrolyte; and
   (6) twisting and placing the $(CNT)@Fe_3[Co(CN)_6]_2$ cathode electrode yarn and the CNT@nickel@PP electrode together into a silicone tube, and injecting the fuel electrolyte to the silicone tube, so as to obtain a flexible membrane-free and wire-shaped hydrogen peroxide fuel cell.

2. The method according to claim 1, wherein in step (1), the aqueous solutions of $FeSO_4 \cdot 7H_2O$ and $K_3[Co(CN)_6]$ have concentrations of 0.2 mol/L and 0.15 mol/L, respectively; the mixing of the aqueous solutions is performed at a volume ratio of 1:1, and the magnetic stirring is performed at a rotational speed of 240 revolutions per minute; the low-temperature drying under vacuum is performed for a time of 6 to 10 hours at a temperature of 40° C.

3. The method according to claim 1, wherein in step (2), the carbon nanotube sheet has a length of 15 cm and a width of 2.5 cm, and the first number of layers of the carbon nanotube sheet is 10; the predetermined concentration of the catalyst solution is 5 mg/ml, and an amount of the catalyst solution added dropwise is 1 ml; the twisting by means of the motor is performed at a rotational speed of 100 revolutions per minute for a time of 1 min.

4. The method according to claim 1, wherein in step (3), the carbon nanotube sheet has a length of 15 cm and a width of 2.5 cm, and the second number of layers of the carbon nanotube sheet is 10; in the dispersion, a concentration of the nickel nanopowder is 20 mg/ml, and an amount of the dispersion added dropwise is 2 ml; the twisting by means of the motor is performed at a rotational speed of 100 revolutions per minute for a time of 1 min.

5. The method according to claim 1, wherein in step (4), the two synchronous motors have a rotational speed of 50 revolutions per minute, and the PP monofilament has a diameter of 100 micrometers.

6. The method according to claim 1, wherein in step (5), a concentration of the hydrogen peroxide solution is 0.03 mol/L, a concentration of the perchloric acid solution is 0.15 mol/L, a concentration of the sodium chloride salt solution is 0.1 mol/L, and the hydrogen peroxide solution, the perchloric acid solution, and the sodium chloride salt solution are mixed at a volume ratio of 1:1:1.

7. The method according to claim 1, wherein the silicone tube in step (6) has an inner diameter of 0.1 mm and a length of 10 to 20 cm.

* * * * *